(12) United States Patent
Erickson et al.

(10) Patent No.: US 7,357,608 B2
(45) Date of Patent: Apr. 15, 2008

(54) ROTARY TAPERED TOOL HOLDER

(75) Inventors: Robert A. Erickson, Raleigh, NC (US); Ted R. Massa, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 304 days.

(21) Appl. No.: 11/274,006

(22) Filed: Nov. 15, 2005

(65) Prior Publication Data

US 2007/0110534 A1    May 17, 2007

(51) Int. Cl.
*B23Q 3/12* (2006.01)

(52) U.S. Cl. .................... 409/235; 408/239 A

(58) Field of Classification Search ......... 409/232, 409/234; 408/238, 239 R, 239 A; *B23Q 3/12*
See application file for complete search history.

(56) References Cited

U.S. PATENT DOCUMENTS

| | | | |
|---|---|---|---|
| 4,714,389 A | | 12/1987 | Johne |
| 4,726,721 A | * | 2/1988 | Heel et al. ............ 409/233 |
| 4,840,520 A | | 6/1989 | Pfalzgraf |
| 4,886,402 A | | 12/1989 | Pfalzgraf |
| 5,011,346 A | * | 4/1991 | Pfalzgraf ............ 409/234 |
| 5,030,047 A | | 7/1991 | Pfalzgraf |
| 5,201,621 A | | 4/1993 | McMurtry et al. |
| 5,716,173 A | | 2/1998 | Matsumoto |
| 5,775,857 A | | 7/1998 | Johne |
| 5,964,556 A | | 10/1999 | Toyomoto |
| 6,077,003 A | | 6/2000 | Laube |
| 6,224,306 B1 | | 5/2001 | Hiroumi et al. |

FOREIGN PATENT DOCUMENTS

| | | | |
|---|---|---|---|
| DE | 4110857 A1 | * | 10/1992 |
| DE | 10051852 A1 | * | 4/2002 |
| JP | 07276168 A | | 10/1995 |
| JP | 07299614 A | * | 11/1995 |
| JP | 09011009 A | * | 1/1997 |
| JP | 09038837 A | | 2/1997 |
| JP | 10058260 A | * | 3/1998 |
| JP | 2000158214 A | * | 6/2000 |
| JP | 2000158269 A | | 6/2000 |
| JP | 2000158270 A | | 6/2000 |
| JP | 2000190111 A | * | 7/2000 |
| JP | 2001310228 A | | 11/2001 |
| JP | 2002103112 A | | 4/2002 |

* cited by examiner

*Primary Examiner*—Daniel W. Howell
(74) *Attorney, Agent, or Firm*—Larry R. Meenan

(57) ABSTRACT

A rotary tapered tool holder includes a shank including a front mounting portion and an aperture. An expansion sleeve is disposed about a portion of the shank. The expansion sleeve includes a front mounting portion adjacent the front mounting portion of the shank. An expansion rod is disposed within the shank and includes a pocket or cam surface. An expansion pin is at least partially received in the aperture of the shank. The expansion pin has a first end or cam surface for engaging the pocket of the expansion rod, and a second end for engaging the front mounting portion of the expansion sleeve. A force applied to the expansion rod in a first direction causes the expansion pin to move in a second direction and into positive engagement with the front mounting portion of the expansion sleeve, thereby forcing the expansion sleeve into positive contact with a tapered bore of a spindle of the tool holder.

14 Claims, 7 Drawing Sheets

ROTARY TAPERED TOOL HOLDER

BACKGROUND OF THE INVENTION

Rotary tapered tool holders, commonly referred to as "steep taper" tool holders, are well known in the art. Steep taper tool holders have a male tapered portion extending from a V-flange portion. The V-flange portion has a V-shaped groove to assist the machine tool changer mechanism in gripping the tool. One of the most common steep taper tool holder designs is the Caterpillar V-flange tool holder, generally referred to as a "CV" tool holder. CV tool holders are one of several standards for very similar tool holder designs, all of which have 7/24 tapers (7 inches of diameter change per 24 inches of length). Another common 7/24 tapered tool holder standard is the "BT" tool holder.

The tapered shank portion of the steep taper tool holder is held in a corresponding female tapered portion of a spindle. There are generally two types of steep taper tool holders: (1) taper-only contact tool holders, in which only the tapered surface of the tool holder contacts the tapered inside surface of the spindle; and (2) face-taper contact tool holders, wherein the face of the tool holder flange is in contact with the face of the spindle in addition to surface contact between the tapered portion of the tool holder and the spindle. The face-taper contact type tool holder can require a specially designed spindle, wherein the mating face of the spindle is machined more precisely to facilitate operating in contact with the face of the tool holder V-flange portion.

Conventional steep taper tool holders of both types can suffer from certain problems. For example, in a standard steep taper tool holder the taper tolerances for tool holder taper and spindle taper produce a situation wherein the adjacent tapers are in hard contact at the front, but may be out of contact at the rear. When the tool holder is rotated, this divergence of taper angles can produce 'rocking' of the tool holder with resulting loss of accuracy and balance. As the spindle is rotated at high speeds, both the spindle taper diameter and the tool holder taper diameter increase under the influence of centrifugal force. However, the spindle taper diameter increases faster than the tool holder taper diameter. Moreover, the diametrical increase is typically not uniform along the length of the spindle taper, but is greatest at the front of the taper. As a result, the spindle taper angle changes, and the tapered surface can even become convex. If the spindle taper were to expand uniformly (maintain the same taper angle), then good fit between spindle and tool holder could be maintained at high speeds via the tool moving axially into the spindle. Unfortunately, because the spindle taper angle changes, the fit between tool holder and spindle degrades at high speeds. The result is two-fold for the standard tool holder. First, since the overall spindle taper diameter increases faster than the tool holder taper diameter, and there is no face contact, the tool holder is drawn into to the spindle (moves axially). Second, because of the taper angle change, the primary contact, which is initially at the front of the taper, moves to the middle or rear of the taper, which results in increased 'rocking' of the tool holder in the spindle. The tool holder taper also increases in diameter and changes angle at high speeds, but the amount of change is very small compared to the spindle because the mean diameters of the tool holder are much smaller.

There are also disadvantages encountered with prior art face-taper contact steep taper tool holders. For example, 'rocking' can be greatly reduced. However, as the tool holder is rotated at high speeds, the spindle taper diameter still increases faster than the tool holder taper diameter, although axial positioning is maintained due to the face contact. But, since the tool holder cannot be drawn into the spindle, a radial gap is produced between the tapers, which allows radial motion of the tool holder and results in loss of accuracy and balance.

Another prior art type face-taper contact tool holder uses a tapered sleeve on a shank which moves axially as the rotational speed increases so that the tool holder stays in contact with the spindle. The moveable sleeve can ease tolerancing requirements, but as the tool holder is rotated at high speeds the sleeve moves axially to stay in contact with the spindle. However, the sleeve also increases in diameter due to the centrifugal forces. Therefore, even though the sleeve maintains contact with the spindle, the sleeve can lose contact with the tool holder shank, resulting in a radial gap, thus resulting in unbalance and loss of accuracy.

Another prior art type face-taper contact tool holder uses a sleeve which is split such that it can flex circumferentially and therefore change diameter. The sleeve can thus stay in simultaneous contact with the tool holder shank and the spindle taper as the spindle taper diameter in changing. However, the sleeve still cannot adapt to the changing taper angle, such that contact is still localized at either the front or rear of the taper. Also, friction limits the ability of the sleeve to always maintain solid contact between tool holder and taper, and some 'slop' is bound to exist, reducing tool holder stiffness. The split sleeve can also be prone to contamination problems since any material that is present between the sleeve and the tool holder shank will reduce the design's effectiveness, and sealing can be impractical.

Each of the prior art tool holder designs described above, generally in the order listed, can provide an incremental improvement over the previous designs. However, each can also have corresponding increases in mechanical complexity, and all require a face contact to operate. Moreover, although each appear to be effective when at rest, they each have varying limitations at high speeds.

Therefore, the prior art face-taper contact tool holders can provide an improvement over the standard tool holder, but they can also have varying limitations at high speeds, increasing mechanical complexity, and all require face contact.

Accordingly, there is a need for an improved steep taper tool holder which can overcome the limitations of the known steep taper tool holders, and reduce or eliminate taper related accuracy and balance problems.

BRIEF SUMMARY OF THE INVENTION

To solve these and other problems associated with conventional steep taper tool holders, the inventors of the present invention have developed a rotary tapered tool holder comprising a shank including a front mounting portion and an aperture; an expansion sleeve disposed about a portion of the shank, the sleeve including a front mounting portion adjacent the front mounting portion of the shank; an expansion rod disposed within the shank, the expansion rod includes a pocket; and an expansion pin at least partially received in the aperture of the shank, the expansion pin having a first end for engaging the pocket of the expansion rod, and a second end for engaging the front mounting portion of the expansion sleeve, wherein a force applied to the expansion rod in a first direction causes the expansion pin to move in a second direction and into positive engagement with the front mounting portion of the expansion sleeve, thereby forcing the expansion sleeve into positive contact with a tapered bore of a spindle of the tool holder.

In another aspect of the invention, a rotary tapered tool holder comprises a body including a front mounting portion and an aperture; an expansion sleeve disposed about a portion of the body; an expansion rod disposed within the body, the expansion rod including a cam surface; a retention knob adapter at least partially disposed within the body and coupled to the expansion rod; and an expansion pin at least partially received in the aperture of the body, the expansion pin having a first end forming a cam surface for engaging the cam surface of the expansion rod, and a second end for engaging the front mounting portion of the expansion sleeve, wherein a force applied to the expansion rod in an axial direction causes the second end of the expansion pin to move in a radial direction and into positive engagement with the front mounting portion of the expansion sleeve, thereby forcing the expansion sleeve into positive contact with a tapered bore of a spindle of the tool holder.

In yet another aspect of the invention, a rotary tapered tool holder comprises a body including a front mounting portion and an aperture; an expansion sleeve disposed about a portion of the body; an expansion rod disposed within a central bore of the body, the expansion rod including an outer surface with a cam surface; a retention knob adapter at least partially disposed within the central bore of the body, the retention knob adapter coupled to the expansion rod at one end and to a retention knob at another end; and an expansion pin at least partially received in the aperture of the body, the expansion pin having a first end forming a cam surface for engaging the cam surface of the expansion rod, and a second end for engaging the front mounting portion of the expansion sleeve, wherein an axial force applied to the retention knob causes the cam surface of the expansion rod to engage the cam surface to of the expansion pin such that the expansion pin is caused to move in a radial direction and apply a radial force against the front mounting portion of the expansion sleeve, thereby forcing the expansion sleeve into positive contact with a tapered bore of a spindle of the tool holder.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
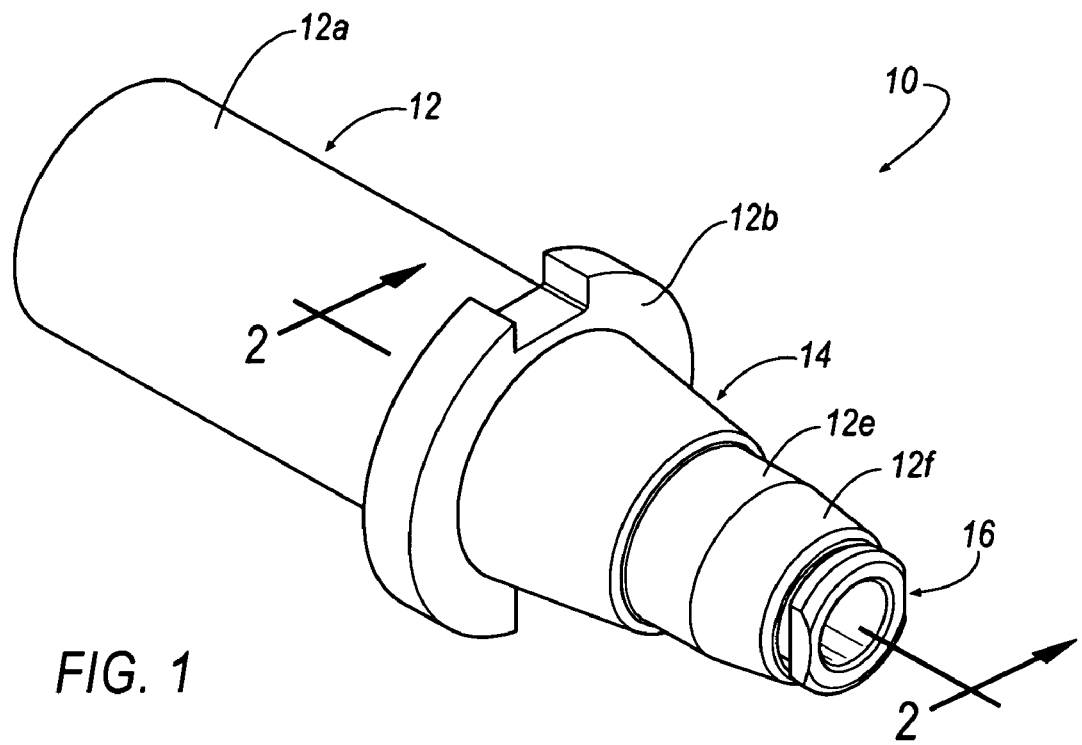
FIG. 1 is a perspective view of a rotary tapered tool holder according to an embodiment of the invention.
Figure 2:
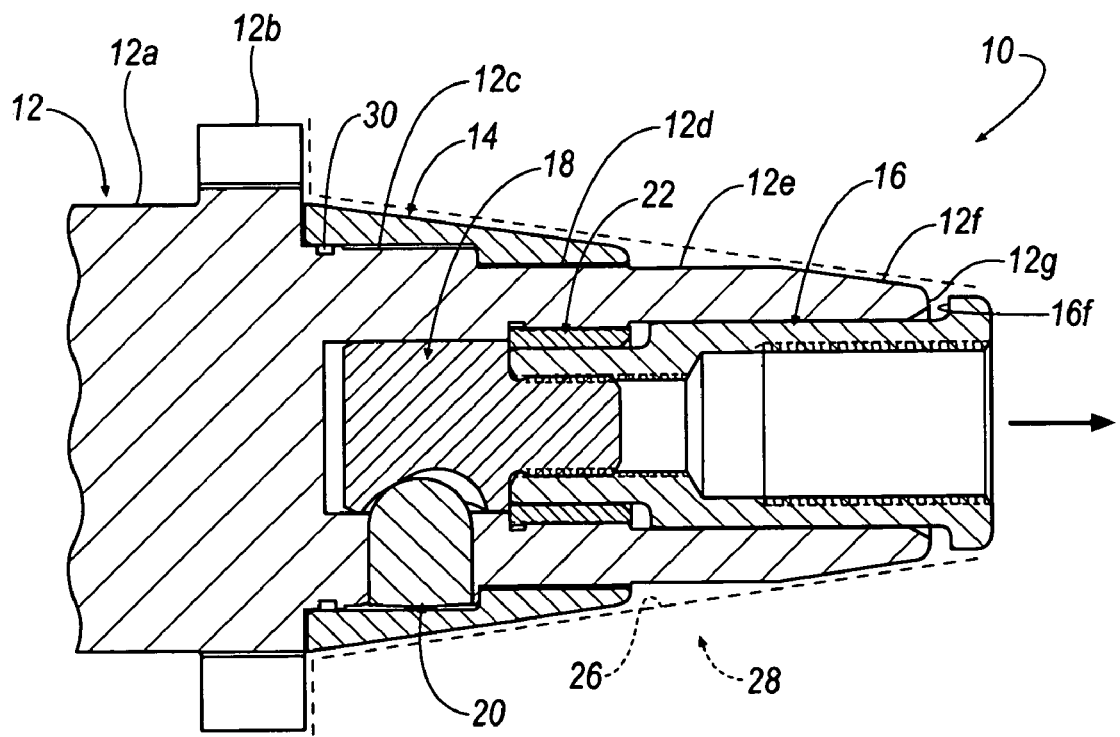
FIG. 2 is a cross-sectional view of the rotary tapered tool holder taken along line 2-2 of FIG. 1.

Referring now to FIGS. 1 and 2, there is shown an embodiment of a rotary, steep taper tool holder, shown generally at 10, for detachably retaining a rotary tool in a tapered bore 26 of a spindle 28 according to the invention. In general, the rotary tapered tool holder 10 comprises a shank or body 12, an expansion sleeve 14 disposed about a portion of the body 12, a retention knob adapter 16, an expansion rod 18 disposed within the body 12, an expansion pin 20 and a lock ring 22 disposed between the body 12 and the retention knob adapter 16.

Figure 3:
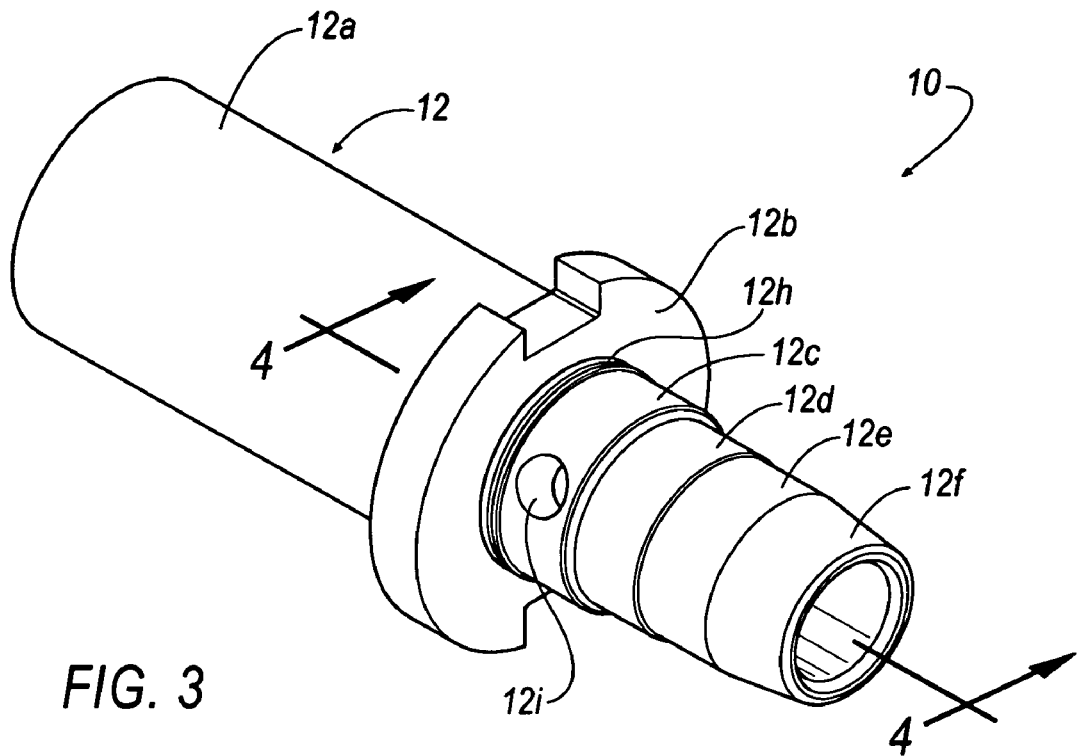
FIG. 3 is a perspective view of a rotary tapered body or shank according to an embodiment of the invention.
Figure 4:
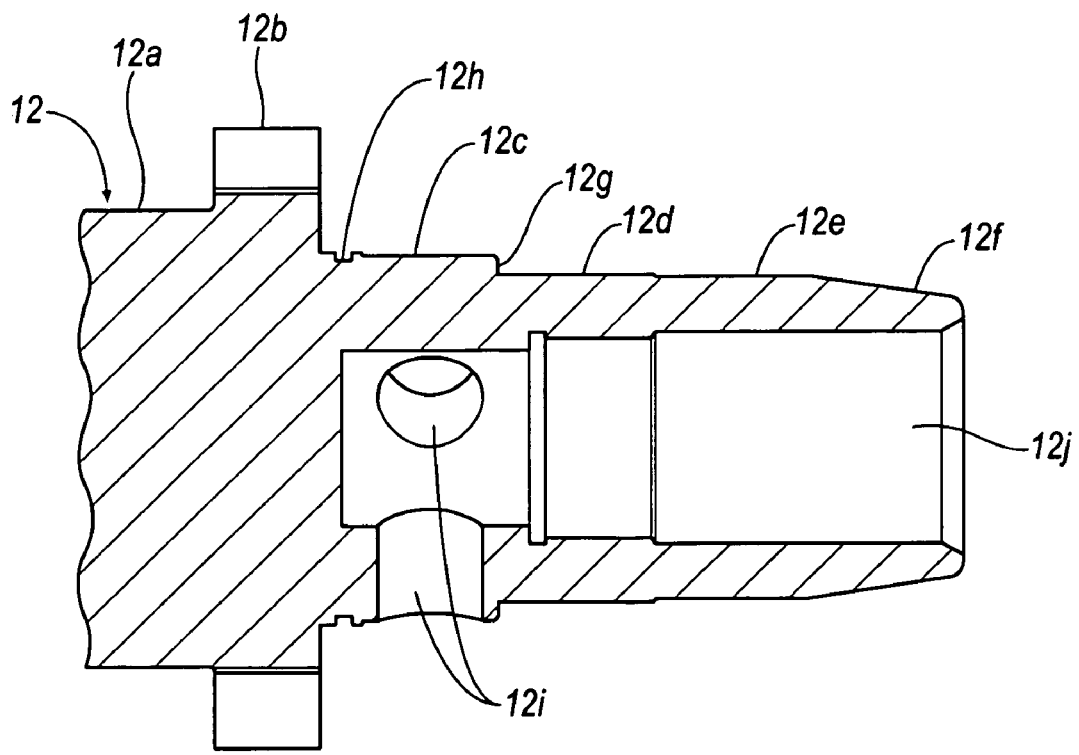
FIG. 4 is a cross-sectional view of the rotary tapered body taken along line 4-4 of FIG. 3.

Referring now to FIGS. 3 and 4, the shank or body 12 includes a tool holder portion 12a, a flange member 12b, a substantially cylindrical front mounting portion 12c for the expansion sleeve 14 (FIG. 1), a reduced diameter substantially cylindrical rear mounting portion 12d for the expansion sleeve 14, a reduced diameter substantially cylindrical clearance portion 12e, and a tapered outer surface 12f that generally corresponds to the tapered bore 26 of the spindle 28. A ledge 12g is formed between the front mounting portion 12c and the rear mounting portion 12d. A circumferential groove 12h is formed in the front mounting portion 12c proximate the flange member 12b for accommodating a sealing member 30, such as a O-ring, and the like, for preventing contaminants from entering between the body 12 and the expansion sleeve 14, as shown in FIG. 2. One or more substantially circular apertures 12i are formed through the front contact member 12c and extend radially from a central bore 12j of the body 12. In the illustrated embodiment, three apertures 12i are formed at an angle of approximately 120° with respect to each other. The purpose of the apertures 12i is to accommodate the expansion pin 20 and allow the expansion pin 20 to move radially with respect to the body 12 as described in more detail below. The central bore 12j of the body 12 also is used to accommodate the retention knob adapter 16, the expansion rod 18 and the lock ring 22 as described in more detail below.

Figure 5:
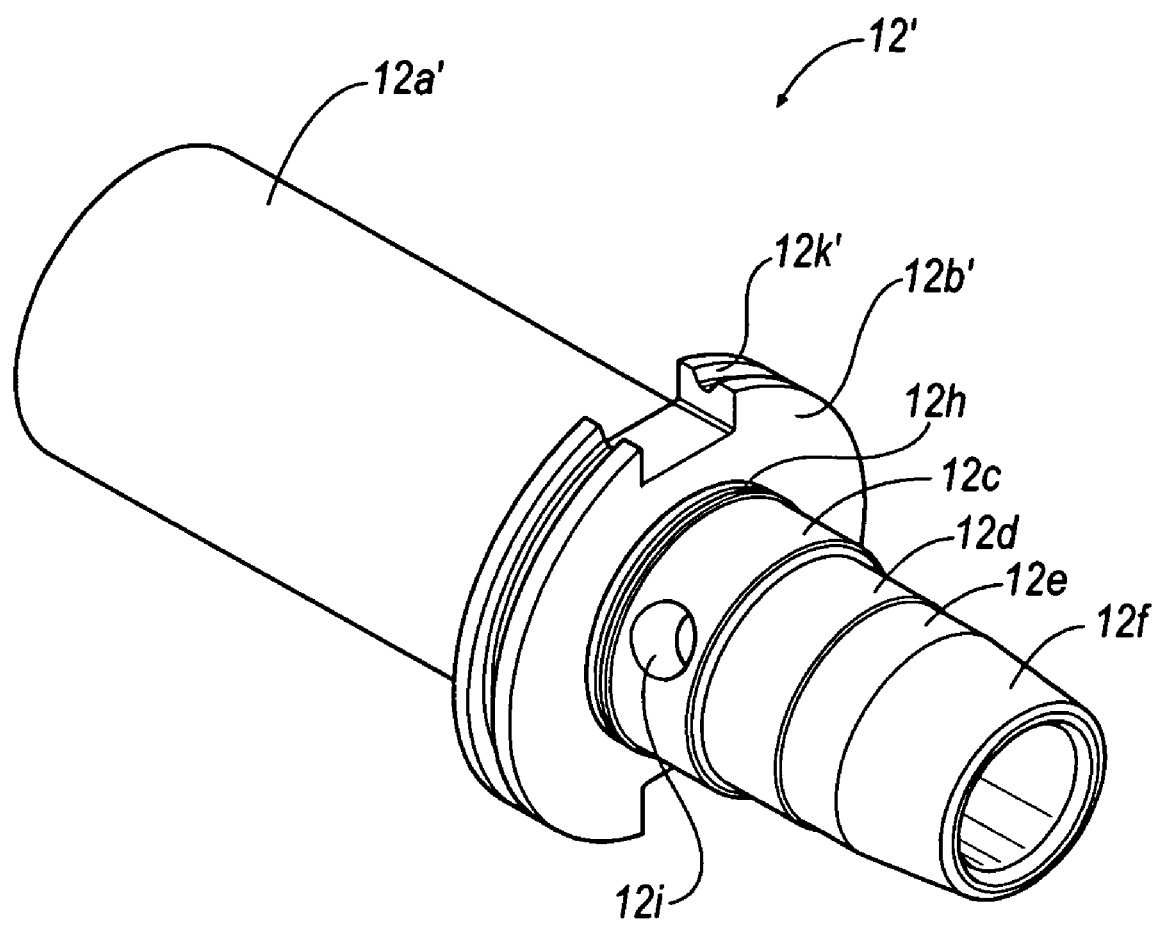
FIG. 5 is a perspective view of a rotary tapered body or shank according to an alternate embodiment of the invention.

Referring now to FIG. 5, a rotary tapered shank or body 12' is shown according to an alternate embodiment. The shank or body 12' is substantially identical to the body 12, except that the tool holder portion 12a is replaced with a tool holder portion 12a' having a relatively shorter length, and the flange member 12b is replaced with a flange member 12b' with a V-shaped notch 12k' formed around the periphery thereof.

Figure 6:
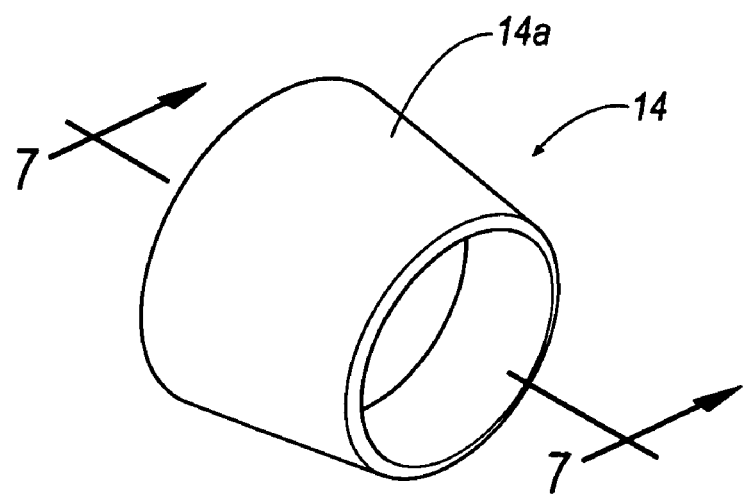
FIG. 6 is a perspective view of an expansion sleeve according to an embodiment of the invention.
Figure 7:
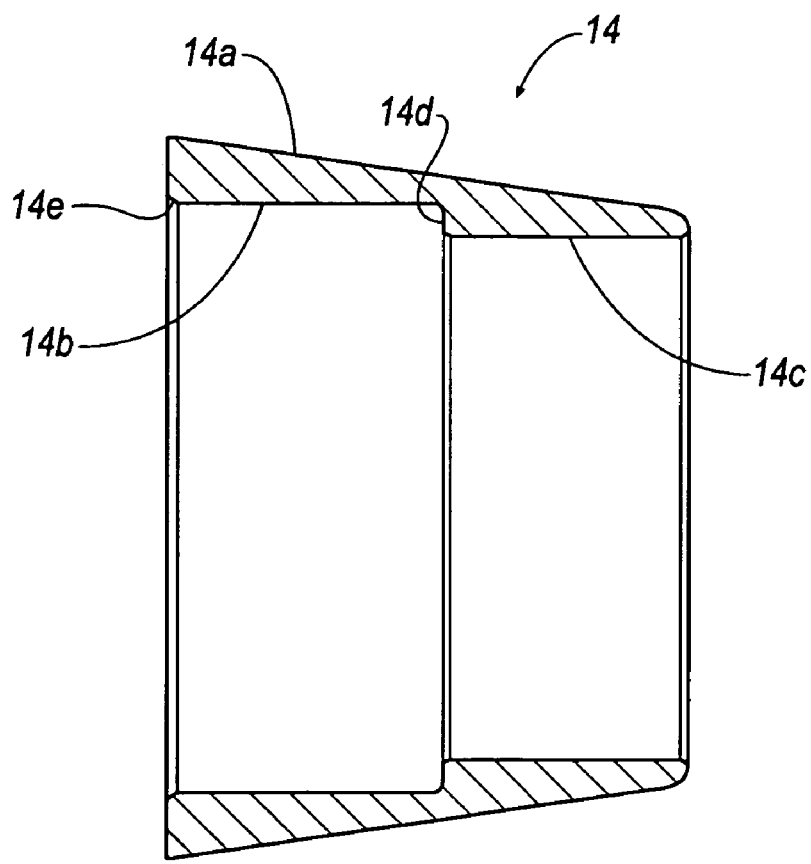
FIG. 7 is a cross-sectional view of the expansion sleeve taken along line 7-7 of FIG. 6.

Referring now to FIGS. 6 and 7, the expansion sleeve 14 is substantially annular and includes a tapered outer surface 14a designed to provide contact with a tapered bore 26 of a spindle 28 (shown in phantom in FIG. 2). The inner surface of the expansion sleeve 14 includes a substantially cylindrical front mounting portion 14b and a substantially cylindrical rear mounting portion 14c. A ledge 14d is formed between the front mounting portion 14b having a relatively larger diameter and the rear mounting portion 14c having a relatively smaller diameter. A chamfer 14e may be formed in an end of the front mounting portion 14b proximate the flange member 12b of the body 12 to accommodate the sealing member (not shown). As shown in FIGS. 1 and 2, the front mounting portion 14b and the rear mounting portion 14c of the expansion sleeve 14 is disposed around the front mounting portion 12c and the rear mounting portion 12d of the body 12 when the tool holder 10 is assembled. Specifically, the front mounting portion 14b of the expansion sleeve 14 does not contact the front mounting portion 12c of the body 12, while the rear mounting portion 14c of the expansion sleeve 14 contacts the rear mounting portion 12d of the body 12 to retain the expansion sleeve 14. In addition, the ledge 12g of the body 12 abuts the ledge 14d of the expansion sleeve 14.

Alternatively, the expansion sleeve 14 can be integrally-formed with the body 12 by performing a machining operation, such as a trepanning machining operation, and the like. Specifically, the expansion sleeve 14 can be integrally-formed with and extend from the flange member 12b, 12b' of the body 12. In this embodiment, the rear mounting portion 14c of the expansion sleeve 14 can be eliminated.

Figure 8:
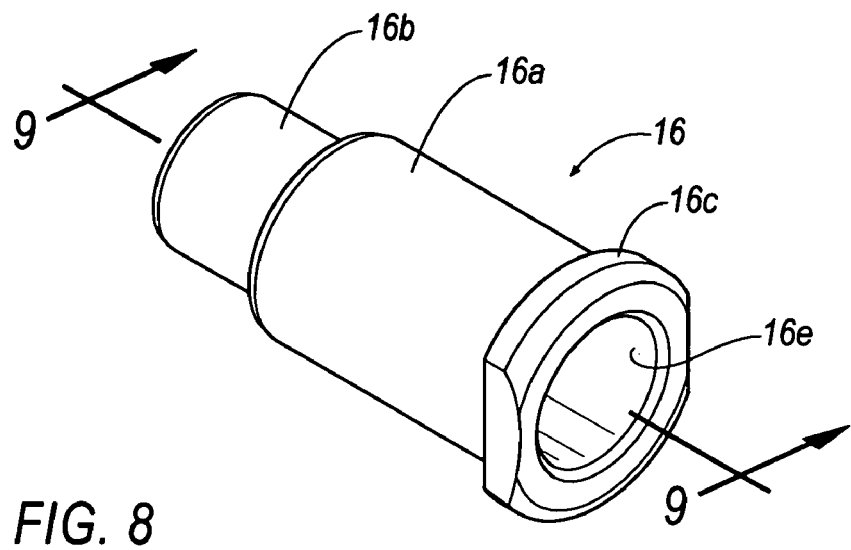
FIG. 8 is a perspective view of a retention knob adapter according to an embodiment of the invention.
Figure 9:
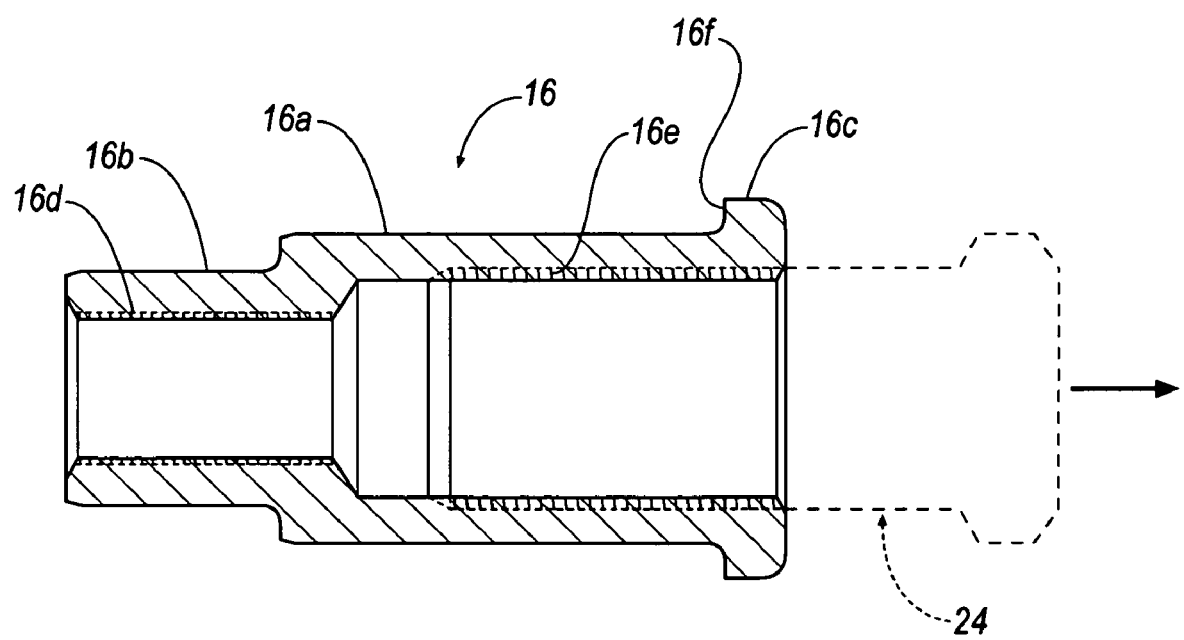
FIG. 9 is a cross-sectional view of the retention knob adapter taken along line 9-9 of FIG. 8.

Referring now to FIGS. 8 and 9, the retention knob adapter 16 is substantially annular and includes a first outer surface portion 16a, a second outer surface portion 16b and a third outer surface portion 16c. The first outer surface portion 16a has an outer diameter that substantially equal to the diameter of the central bore 12j of the body 12 such that the retention knob adapter 16 can be at least partially disposed within the central bore 12j of the body. The second outer surface portion 16b has a relatively smaller diameter as compared to the first outer surface portion 16a. The third outer surface portion 16c is located at one end of the first outer surface portion 16a and has a relatively larger diameter as compared to the first outer surface portion 16a. As seen in FIG. 2, a leading face 16f of the retention knob adapter 16 may engage a rear face 12g of the body 12, thereby acting as a stop for the retention knob adapter 16 when the tool holder 10 is assembled. In addition, the second outer surface portion 16b allows for the lock ring 22 to be disposed therearound when the tool holder 10 is assembled, as shown in FIG. 2. Referring back to FIG. 9, the retention knob adapter 16 includes a first inner threaded portion 16d and a second inner threaded portion 16e. The first inner threaded portion 16d is capable of threadingly engaging the expansion rod 18, while the second inner threaded portion 16e is capable of threadingly engaging a retention knob 24 (shown in phantom in FIG. 9). Thus, a force or tension applied to the retention knob 24, for example, in the direction of the arrow in FIG. 9, will be transferred directly to the expansion rod 18.

Figure 10:
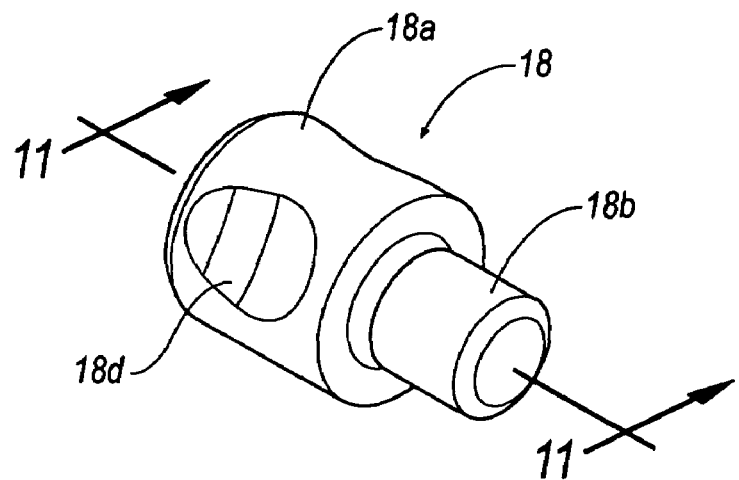
FIG. 10 is a perspective view of an expansion rod according to an embodiment of the invention.
Figure 11:
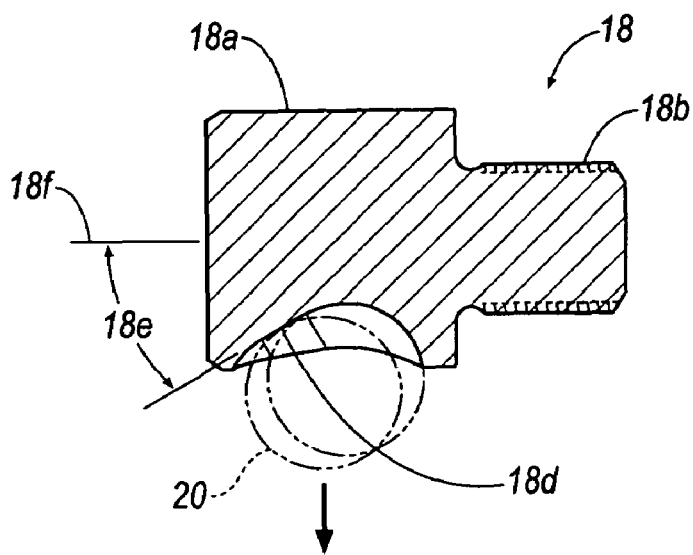
FIG. 11 is a cross-sectional view of the expansion rod taken along line 11-11 of FIG. 10.

Referring now to FIGS. 10 and 11, the expansion rod 18 includes a first outer surface portion 18a and a second outer surface portion 18b. The first outer surface portion 18a includes one or more concave-shaped pockets or cam surfaces 18d. In the illustrated embodiment, three concave-shaped cam surfaces 18d are formed on the first outer surface portion 18a at approximately 120° apart from each other. The three concave-shaped cam surfaces 18d correspond in number to the three apertures 12i of the body 12 and are substantially aligned therewith when the tool holder 10 is assembled. In this manner, the expansion pin 20 can be at least partially disposed within the aperture 12i and are capable of engaging the cam surface 18d, as shown in FIG. 2. As seen in FIG. 11, the concave-shaped cam surface 18d forms an angle 18e with respect to a longitudinal axis, 18f, of the expansion rod 18. The angle 18e can be any desired angle, for example, 30°, 45°, 60°, and the like. Specifically, a higher angle 18e causes the expansion pin 20 to produce a relatively lower expansion force in the radial direction (in the direction of the arrow in FIG. 11) as compared to a lower angle 18e for a given clamping force. In the illustrated embodiment, the angle 18e is approximately 30°.

Figure 12:
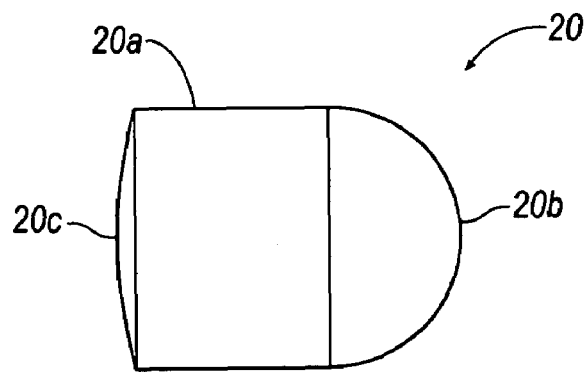
FIG. 12 is a side view of an expansion pin according to an embodiment of the invention.

Referring now to FIG. 12, the expansion pin 20 includes a substantially circular outer surface 20a, a convex-shaped cam surface 20b at one end for engaging the concave-shaped cam surface 18d of the expansion rod 18, and a convex-shaped outer surface 20c at the other end for engaging the front mounting portion 14b of the expansion sleeve 14. As seen in FIG. 2, the expansion pin 20 has a length sufficient to at least partially reside within the aperture 12i of the body 12, while the cam surface 20b is capable of engaging the cam surface 18d of the expansion rod 18 and the outer surface 20c is capable of engaging the front mounting portion 14b of the expansion sleeve 14. Specifically, the shape of the cam surface 20b of the expansion pin 20 is optimized to provide a maximum amount of expansion force over a maximum amount of surface area of the cam surface 18d of the expansion rod 18. Likewise, the shape of the cam surface 20c of the expansion pin 20 is optimized to provide a maximum amount of expansion force over a maximum amount of surface area of the front mounting portion 14b of the expansion sleeve 14. In this manner, the axial movement (in the direction of the arrow in FIGS. 2 and 9) of the expansion rod 18 causes the expansion pin 20 to move radially outward (in the direction of the arrow in FIG. 11) and apply an expansion force against the front mounting portion 14b of the expansion sleeve 14, thereby causing the expansion sleeve 14 to maintain positive contact against the tapered bore 26 of the spindle 28 (FIG. 2).

It will be appreciated that the invention is not limited by the specific shape of the expansion pin 20, and that the invention may be only limited by the cooperation between the cam surface 20b, 20c of the expansion pin 20 and the cam surface 18b of the expansion rod 18 and the front mounting portion 14b of the expansion sleeve 14, respectively. For example, the shape of the expansion pin 20 can be a substantially circular element, such as a ball bearing, and the like, and the expansion rod 18 and the expansion sleeve 14 can have a cooperating cam surface 18b and front mounting portion 14b, respectively.

Figure 13:
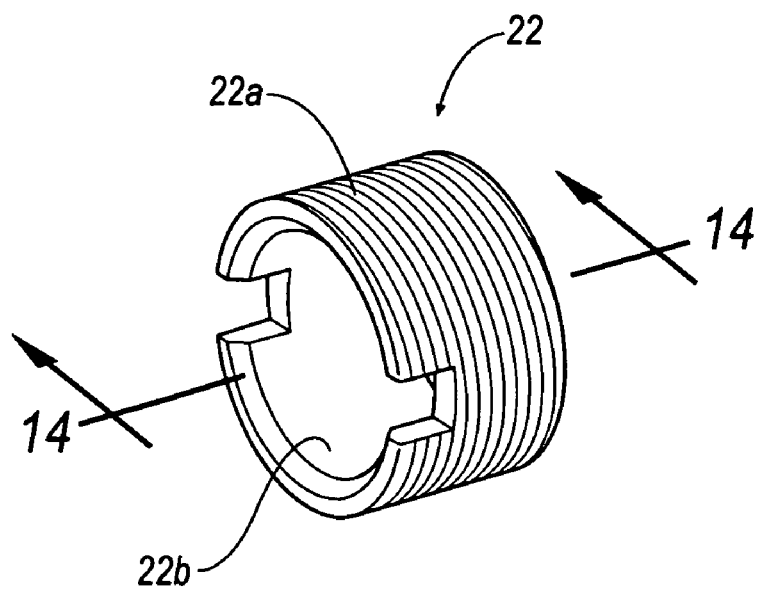
FIG. 13 is a perspective view of a lock ring according to an embodiment of the invention.
Figure 14:
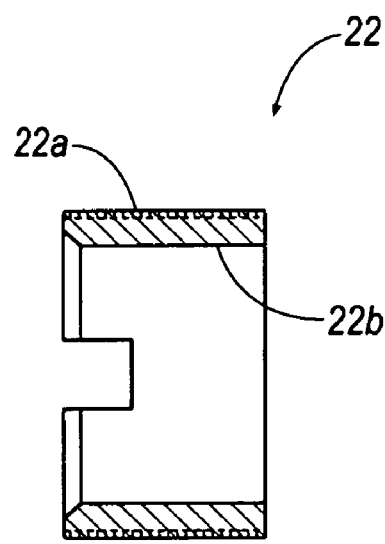
FIG. 14 is a cross-sectional view of the lock ring taken along line 14-14 of FIG. 13.

Referring now to FIGS. 13 and 14, the lock ring 22 is substantially annular and includes a threaded outer surface 22a and an inner surface 22b. As seen in FIG. 2, the lock ring 22 is disposed between the retention knob adapter 16 and the body 12. The purpose of the lock ring 22 is to act as a stop for the retention knob adapter 16 and the expansion rod 18 in the axial direction (direction of the arrow in FIGS. 2 and 9).

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A rotary tapered tool holder, comprising:
    a shank including a front mounting portion and an aperture;
    an expansion sleeve disposed about a portion of the shank, the expansion sleeve including a front mounting portion adjacent the front mounting portion of the shank; and
    an expansion rod disposed within the shank, the expansion rod including a pocket;

an expansion pin at least partially received in the aperture of the shank, the expansion pin having a first end for engaging the pocket of the expansion rod, and a second end for engaging the front mounting portion of the expansion sleeve, wherein a force applied to the expansion rod in a first direction causes the expansion pin to move in a second direction and into positive engagement with the front mounting portion of the expansion sleeve, thereby forcing the expansion sleeve into positive contact with a tapered bore of a spindle of the tool holder.

2. The rotary tapered tool holder of claim 1, further comprising a retention knob adapter at least partially disposed within the shank and coupled to the expansion rod.

3. The rotary tapered tool holder of claim 2, further comprising a retention knob coupled to the retention knob adapter, wherein a force applied to the retention knob in the first direction causes the expansion rod to move in the first direction.

4. The rotary tapered tool holder of claim 2, further comprising a lock ring disposed between the shank and the retention knob adapter.

5. The rotary tapered tool holder of claim 1, further comprising a sealing member for preventing contaminants from entering between the shank and the expansion sleeve.

6. The rotary tapered tool holder of claim 1, wherein the first direction is an axial direction, and wherein the second direction is a radial direction.

7. The rotary tapered tool holder of claim 1, wherein the expansion sleeve is integrally-formed with the shank.

8. A rotary tapered tool holder, comprising:
a body including a front mounting portion and an aperture;
an expansion sleeve disposed about a portion of the body;
an expansion rod disposed within the body, the expansion rod including a cam surface;
a retention knob adapter at least partially disposed within the body and coupled to the expansion rod;
a lock ring disposed between the body and the retention knob adapter; and
an expansion pin at least partially received in the aperture of the body, the expansion pin having a first end forming a cam surface for engaging the cam surface of the expansion rod, and a second end for engaging the front mounting portion of the expansion sleeve,
wherein a force applied to the expansion rod in an axial direction causes the second end of the expansion pin to move in a radial direction and into positive engagement with the front mounting portion of the expansion sleeve, thereby forcing the expansion sleeve into positive contact with a tapered bore of a spindle of the tool holder.

9. The rotary tapered tool holder of claim 8, further comprising a retention knob coupled to the retention knob adapter, wherein a force applied to the retention knob in the axial direction causes the expansion rod to move in the radial direction.

10. The rotary tapered tool holder of claim 8, further comprising a sealing member for preventing contaminants from entering between the body and the expansion sleeve.

11. The rotary tapered tool holder of claim 8, wherein the expansion sleeve is integrally-formed with the body.

12. A rotary tapered tool holder, comprising:
a body including a front mounting portion and an aperture;
an expansion sleeve disposed about a portion of the body;
an expansion rod disposed within a central bore of the body, the expansion rod including an outer surface with a cam surface;
a retention knob adapter at least partially disposed within the central bore of the body, the retention knob adapter coupled to the expansion rod at one end and to a retention knob at another end;
a lock ring disposed between the body and the retention knob adapter; and
an expansion pin at least partially received in the aperture of the body, the expansion pin having a first end forming a cam surface for engaging the cam surface of the expansion rod, and a second end for engaging the front mounting portion of the expansion sleeve,
wherein an axial force applied to the retention knob causes the cam surface of the expansion rod to engage the cam surface to of the expansion pin such that the expansion pin is caused to move in a radial direction and apply a radial force against the front mounting portion of the expansion sleeve, thereby forcing the expansion sleeve into positive contact with a tapered bore of a spindle of the tool holder.

13. The rotary tapered tool holder of claim 12, further comprising a sealing member for preventing contaminants from entering between the body and the expansion sleeve.

14. The rotary tapered tool holder of claim 12, wherein the expansion sleeve is integrally-formed with the body.

* * * * *